United States Patent [19]
Maggert et al.

[11] Patent Number: 6,045,946
[45] Date of Patent: Apr. 4, 2000

[54] BATTERY TAB

[75] Inventors: Kevin K. Maggert, Lawrenceville; Charles Friedli, Duluth; Laurence A. Bay, Lawrenceville, all of Ga.

[73] Assignee: Motorola, Inc., Schaumburg, Ill.

[21] Appl. No.: 09/032,879

[22] Filed: Mar. 2, 1998

[51] Int. Cl.[7] .............................. H01M 2/22; H01M 2/30
[52] U.S. Cl. ...................... 429/211; 429/127; 429/179
[58] Field of Search ..................................... 429/211, 127, 429/162, 178, 179

[56] References Cited

U.S. PATENT DOCUMENTS 3,607,401  9/1971  Halpert et al. .
3,607,432  9/1971  Johnson .
4,439,281  3/1984  Schneider et al. .................. 429/211 X
5,456,813  10/1995  Grange-Cossou et al. ......... 429/211 X

*Primary Examiner*—Maria Nuzzolillo
*Assistant Examiner*—Jonathan Crepeau
*Attorney, Agent, or Firm*—Felipe J. Farley; Philip H. Burrus, IV

[57] ABSTRACT

A foil battery packaging containing a battery cell is described wherein the tab comprises a strong metal tab secured to the packaging, and wherein the strong metal tab is electrically connected to a weak metal tab of the battery cell. The packaging may also comprise a metal reinforcing strip secured to the strong metal tab, the weak metal tab, and the battery packaging.

4 Claims, 4 Drawing Sheets

BATTERY TAB

TECHNICAL FIELD

This invention relates in general to battery tabs

BACKGROUND OF THE INVENTION

Rechargeable lithium batteries operating at room temperature offer several advantages compared to conventional aqueous technologies. These advantages include higher energy density (up to 150 watts-hours per kilogram), higher cell voltages (up to about 4 volts per cell), and longer charge retention or shelf life (up to 5–10 years). These advantages result in part from the high standard potential and low electrochemical equivalent weight of lithium.

An alternative to liquid electrolytes in lithium cells is a solid polymer electrolyte formed by incorporating lithium salt into polymer matrices and casting into thin films. These polymers can be used as both the electrolyte and separator. They have lower conductivities and lower lithium-ion transport numbers than the liquid electrolytes but are less reactive with lithium, which should enhance the safety of the battery. Much research has been devoted to the creation of lithium-polymer batteries. The objective of this effort, as with any battery program, is to develop batteries which have high energy density, high power density, good cycle life and charge retention, and provide this high performance reliably and safely. Of course, the advantageous characteristics of lithium cells are all for naught if the battery materials cannot be packaged properly. The foil packaging and flimsy tabs currently employed with lithium polymer cells are not sufficiently durable to make for a robust consumer product. Therefore, there is a need for improved packaging and tabs for lithium polymer cells.

DETAILED DESCRIPTION OF THE PREFERRED EMBODIMENT

The present invention is a foil battery packaging containing a battery cell, where the tab comprises a strong metal tab secured to the packaging wherein the strong metal tab is electrically connected to the weak metal tab of the battery cell. The present invention also comprises the aforementioned foil battery packaging where a metal reinforcing strip is secured to the strong metal tab, the weak metal tab, and the battery packaging. In one embodiment of the invention, the strong metal is nickel-plated cold-rolled steel. In another embodiment of the invention, the weak metal is aluminum foil or copper foil.

Figure 6:
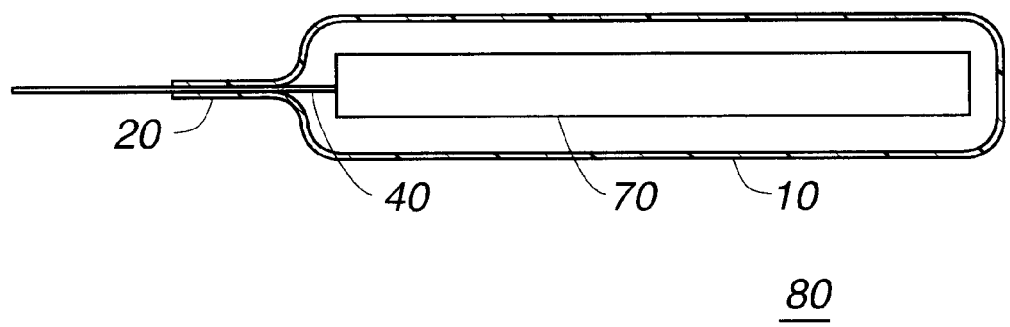
FIG. 6 is a side cutaway view of the battery packaging for a lithium polymer cell of the prior art showing the cell and the weak metal tabs extending from the battery cell to the exterior of the packaging.
Figure 7:
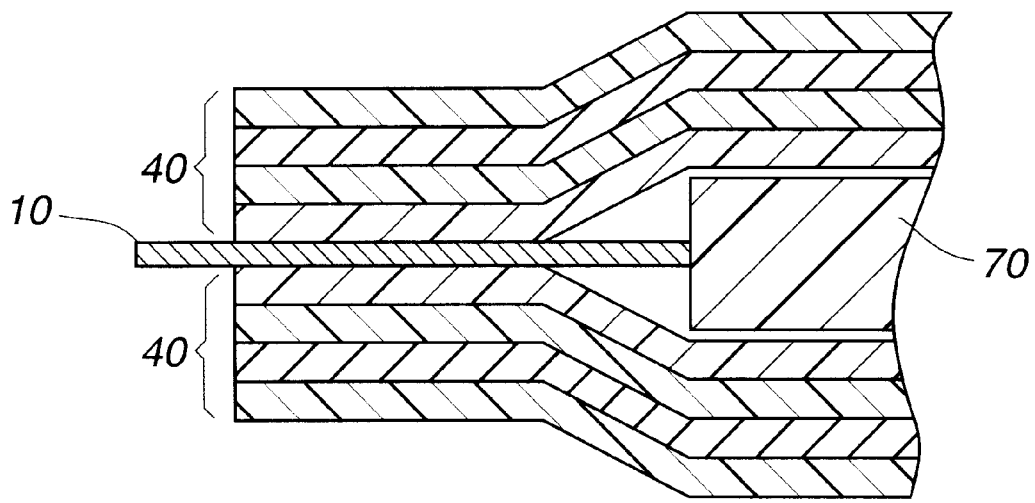
FIG. 7 is a side cutaway view of the battery packaging for a lithium polymer cell showing the complexity of the packaging layers.

FIG. 6 is a cutaway side view of a typical lithium polymer battery (80). The battery cell (70) is contained within a battery packaging (10). The battery cell (70) has a weak metal tab (40) extending from the battery cell to the exterior of the packaging (10). The battery packaging (10) is hermetically sealed in the sealed area (20) near the package opening. The weak metal tab (40) is typically made of aluminum if it is the cathode, or nickel or copper, if it is the anode. The tab (40) and is very thin so that the package (10) can be hermetically sealed. As a consequence, the weak metal tab (40) is very weak, and tears easily. Therefore, if such a battery were put in a commercial product, it might not be able to withstand shaking and jostling. FIG. 7 shows an expanded size cutaway view of a lithium polymer battery 80. The packaging 10 comprises several layers: tough thermoplastic, aluminum, tough thermoplastic, and a modified polyolefin. The packaging is only about 0.1 millimeter thick. The cell 70 is contained in the packaging 10. The weak metal tab 40 protrudes from the interior of the packaging 10 out to the exterior.

Figure 5:
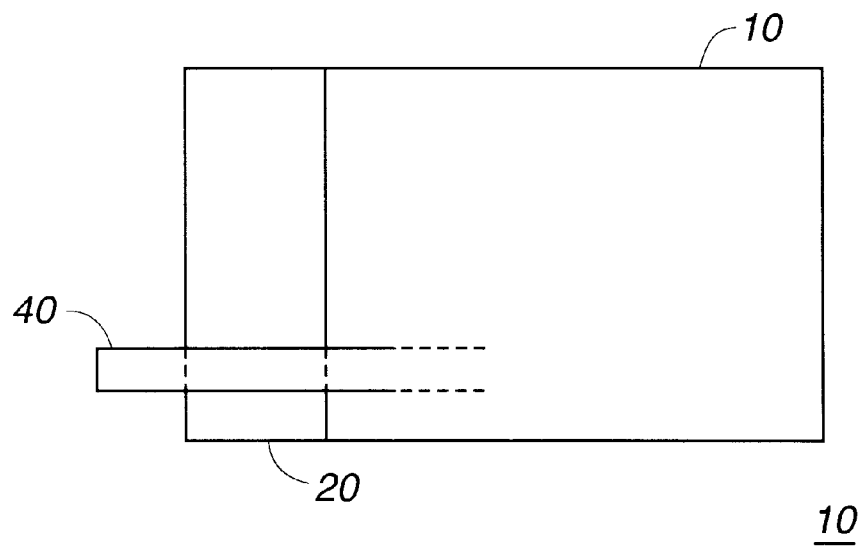
FIG. 5 is a cutaway view of prior art battery packaging for a lithium polymer cell showing the weak metal tab.

FIG. 5 is a cutaway top view of the lithium polymer battery (80) shown in FIG. 6. Here the battery cell (70) is not shown. Here we see the bottom half of the battery packaging (10), the sealed area (20) near the opening of the packaging and the weak metal tab (40).

Figure 1:
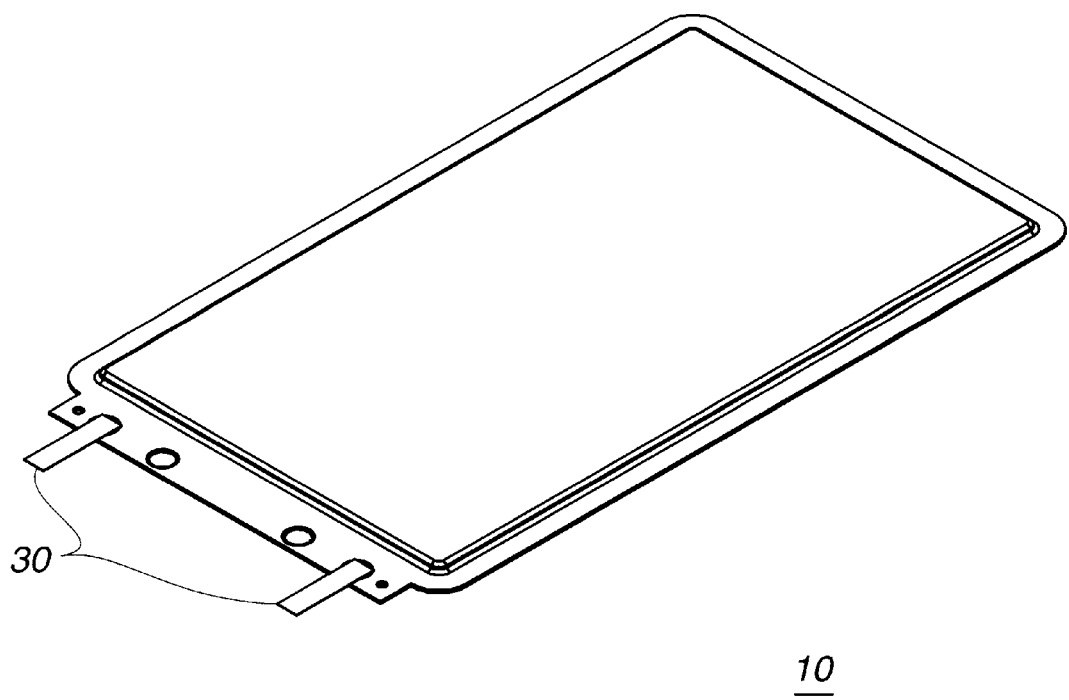
FIG. 1 is a perspective view of the battery packaging of the present invention, showing the strong metal tabs.
Figure 2:
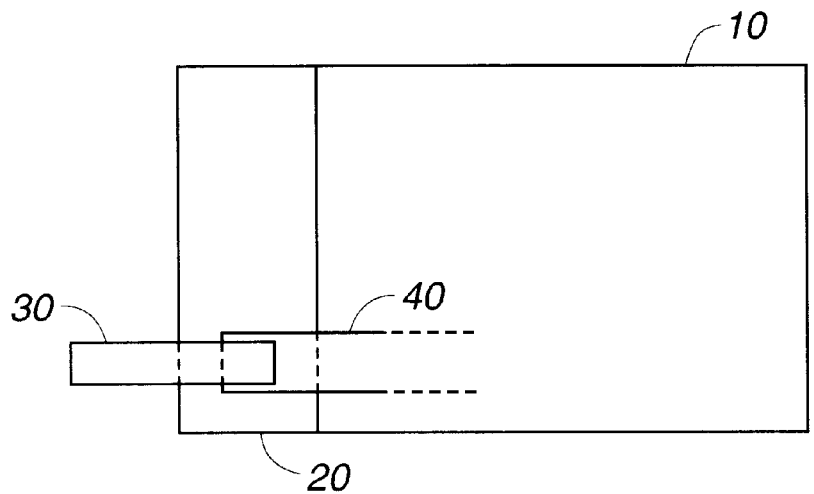
FIG. 2 is a cutaway view of the battery packaging of the present invention showing the strong and weak metal tabs.

FIG. 1 shows the foil battery packaging of the present invention. FIG. 1 shows battery packaging 10, with strong metal tabs 30 secured to the packaging. FIG. 2 is a cutaway view showing the lower half of the battery packaging (10) and shows one tab (30,40). This battery packaging (10) has a sealed area (20) near the package opening. The weak metal tab (40) extends from the exterior of the battery packaging (10), from a battery cell (not shown). Mechanically and electrically secured to that weak metal tab (40) is a strong metal tab (30). This strong metal tab (30) is also mechanically secured to the battery packaging (10) in the sealed area (20). When the battery packaging (10) is completed, the corresponding upper half of the battery packaging would be sealed to the lower half. This strong metal tab which can be nickel plated cold-rolled steel, is quite resistant to tearing. Furthermore, any forces placed on it will be transmitted to the battery packaging (10) to which it is mechanically secured, rather than simply tearing the weak metal tab (40) as in the prior art. In one embodiment of the invention, the strong metal tab is secured to the packaging by an adhesive and the weak metal tab (40) is secured to the strong metal tab (30) by welding.

Figure 3:
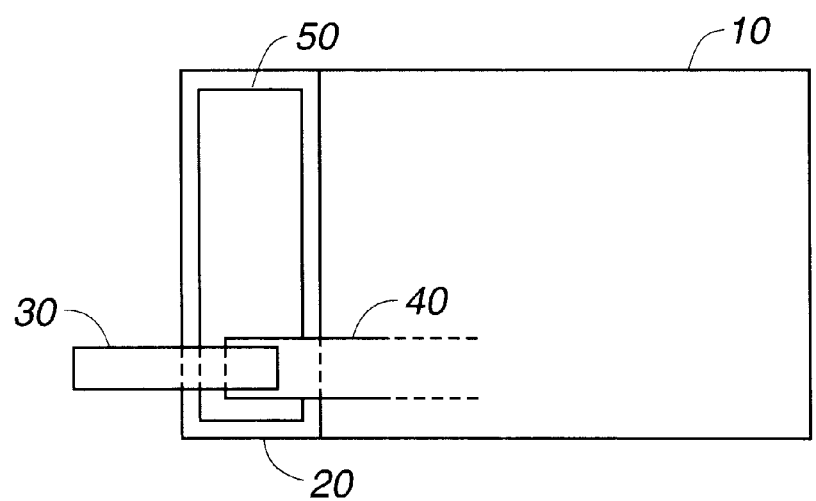
FIG. 3 is a cutaway view of the present invention showing the strong and weak metal tabs and the reinforcing strip.

FIG. 3 shows another embodiment of the present invention. Here, a reinforcing strip (50) is secured to the battery packaging (10) and in this case in the sealed area (20) near the package opening. Both the weak metal tab (40) and the strong metal tab (30) are secured to the reinforcing strip (50) and to the sealed area (20) near the package opening. When the battery packaging is completed, the top half of the battery packaging (10) will be sealed to the lower half of the battery packaging. In FIG. 3, weak metal tab (40) is also electrically connected to strong metal tab (30). Once again, forces acting on strong metal tab (30) will not be transmitted to weak metal tab (40). Instead, those forces will be transmitted to reinforcing strip (50) and packaging (10). In one embodiment of the invention, the weak metal tab (40), strong metal tab 30, and reinforcing strip 50 are welded together, and secured to the packaging 10 by an adhesive.

Figure 4:
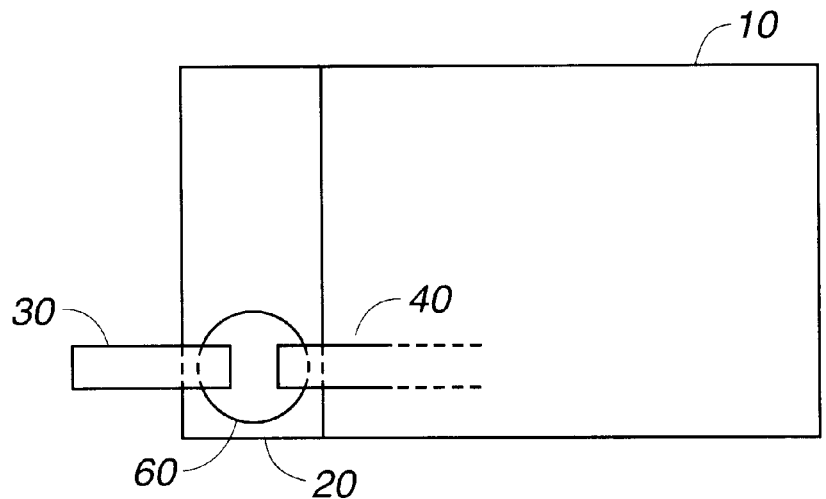
FIG. 4 is a cutaway view of the battery packaging of the present invention showing the weak and strong metal tabs connected to a metal disk.

FIG. 4 shows another embodiment of the invention showing one battery tab (30, 40). Here weak metal tab (40) and strong metal tab (30) are both mechanically and electrically secured to metal disk (60), and in this case mechanically secured to sealed area 20. To complete the package, the upper half of the battery packaging (10) would be sealed to the lower half of the battery packaging. Again, any forces on strong metal tab (30) are transmitted to disk (60) and battery packaging (10) rather than tearing weak metal tab (40). Metal disk 60 may be welded to strong metal tab 30 and weak metal tab 40, and all may be secured to packaging 10 by an adhesive. The present invention offers the obvious advantage of battery tabs resistant to tearing. This permits construction of the reliable consumer product using batteries housed in a foil packaging. In addition, the strong metal tabs (30) may be constructed of nickel-plated cold-rolled steel, a metal with which battery manufacturers are familiar. The present invention may be readily manufactured after reading the present specification. The strong metal tab and the weak metal tab can initially be mechanically secured to each other using only adhesive, and in later steps can be spot welded together creating both a strong mechanical connection and a proper electrical connection. In another embodiment of the invention, the strong metal tab (30) would not extend beyond the end of the battery packaging (10). Rather, an opening in the sealed area (20) would allow electrical access to the strong metal tab (30).

In one embodiment of the invention, the weak metal tab 40 is only electrically connected to the strong metal tab 30. In another embodiment of the invention, reinforcing strip 50 is mechanically secured to the strong metal tab 30 and the packaging 10, but not the weak metal tab 40.

EXAMPLE I

A lithium polymer battery was constructed with foil packaging, measuring 1.65 millimeters by 90.5 millimeters by 6.0 millimeters and weighing 175 grams. The strong metal tabs were rectangular and were about 27 millimeters long by 4 millimeters wide by 5 1000/in thick. The strong metal tabs were made by nickel-coated cold-rolled steel, and was spot-welded to a reinforcing strip of nickel-plated cold-rolled steel. The reinforcing strip was about 85 millimeters long by 4 millimeters wide by 5-1000/in thick. Grasping the strong metal tabs between the thumb and forefinger and pulling the limit of the strength of my thumb and forefinger could not free the strong metal tab from the battery packaging.

In contrast, only a slight pressure from the thumb and forefinger were required to tear the flimsy aluminum tabs of lithium polymer battery packaging tabs of the prior art. Such tabs are typically $2/1000$ inch thick aluminum, copper, or nickel foil.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery comprising a foil battery packaging containing a battery cell, wherein a battery tab extends from the battery cell in the interior of the packaging to the exterior of the packaging, wherein the battery tab is made of two separate segments, wherein the first segment extends from the battery cell to the packaging, and the second segment extends from the battery packaging to the exterior of the battery, wherein a metal reinforcing strip is secured to the second tab segment and the battery packaging.

2. The battery of claim 1, wherein the metal reinforcing strip is further secured to the first tab segment.

3. The battery of claim 1, wherein the battery is a lithium polymer battery.

4. The battery of claim 1, wherein the metal reinforcing strip is a disk.

* * * * *